United States Patent [19]

Dragoo

[11] Patent Number: 4,606,023

[45] Date of Patent: Aug. 12, 1986

[54] GUARD TIME ELIMINATION IN A TIME-DIVISION MULTIPLEXED, ACTIVE STAR-COUPLED, HALF-DUPLEX MODE, SYNCHRONOUS COMMUNICATIONS NETWORK

[75] Inventor: Robert E. Dragoo, Melbourne, Fla.

[73] Assignee: Applied Dynamic Research, Inc., Rockville, Md.

[21] Appl. No.: 615,555

[22] Filed: May 31, 1984

[51] Int. Cl.⁴ .......................... H04J 3/24; H04J 3/06; G02F 1/00; G02F 2/00
[52] U.S. Cl. ...................................... 370/94; 370/103; 370/104; 455/608
[58] Field of Search .................. 370/94, 4, 103, 104; 455/608

[56] References Cited

U.S. PATENT DOCUMENTS 4,375,097  2/1983  Ulug ................................. 370/94
4,417,334  11/1983  Gunderson et al. .................. 370/94
4,450,554  5/1984  Steensma et al. ...................... 370/4

Primary Examiner—Douglas W. Olms
Assistant Examiner—Wellington Chin
Attorney, Agent, or Firm—Lowe Price LeBlanc Becker & Shur

[57] ABSTRACT

Guard-time elimination in a time-division multiplexed, active star-coupled, local area, half-duplex mode, synchronous communications network. Guard time between data packets arriving at the central node of the network is eliminated by adjusting the word slot timing at each terminal such that the data arriving at the central node from each terminal in the network is properly phased with data received from other terminals in the network. The terminal initiallization process required for this timing adjustment is accomplished without disruption of other traffic concurrently being processed through the network.

17 Claims, 5 Drawing Figures

Fig. 1. (PRIOR ART)
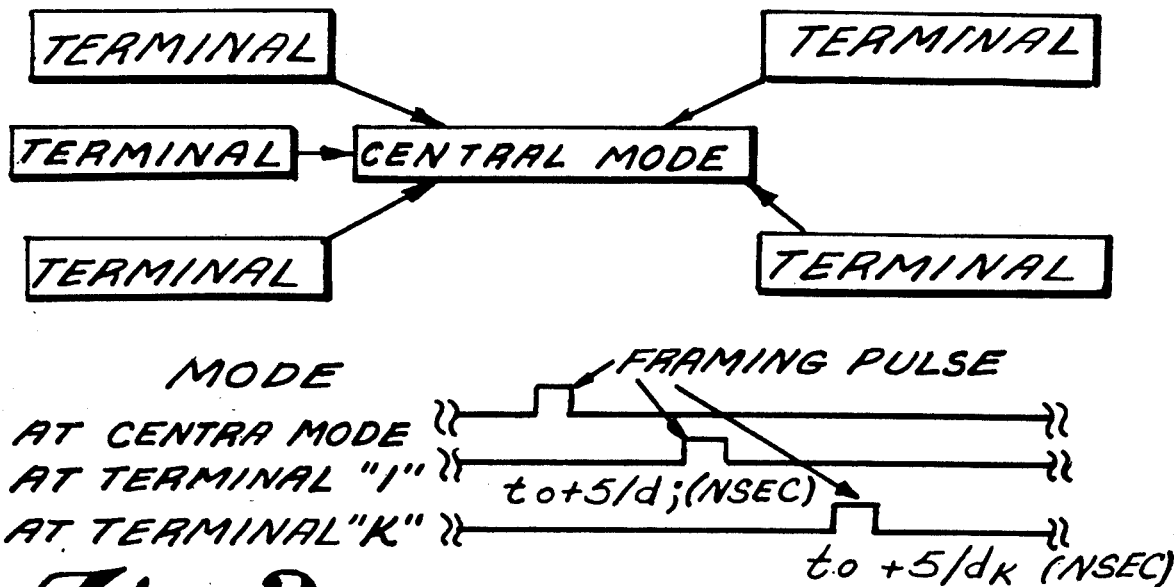
Fig. 2.
Fig. 3.
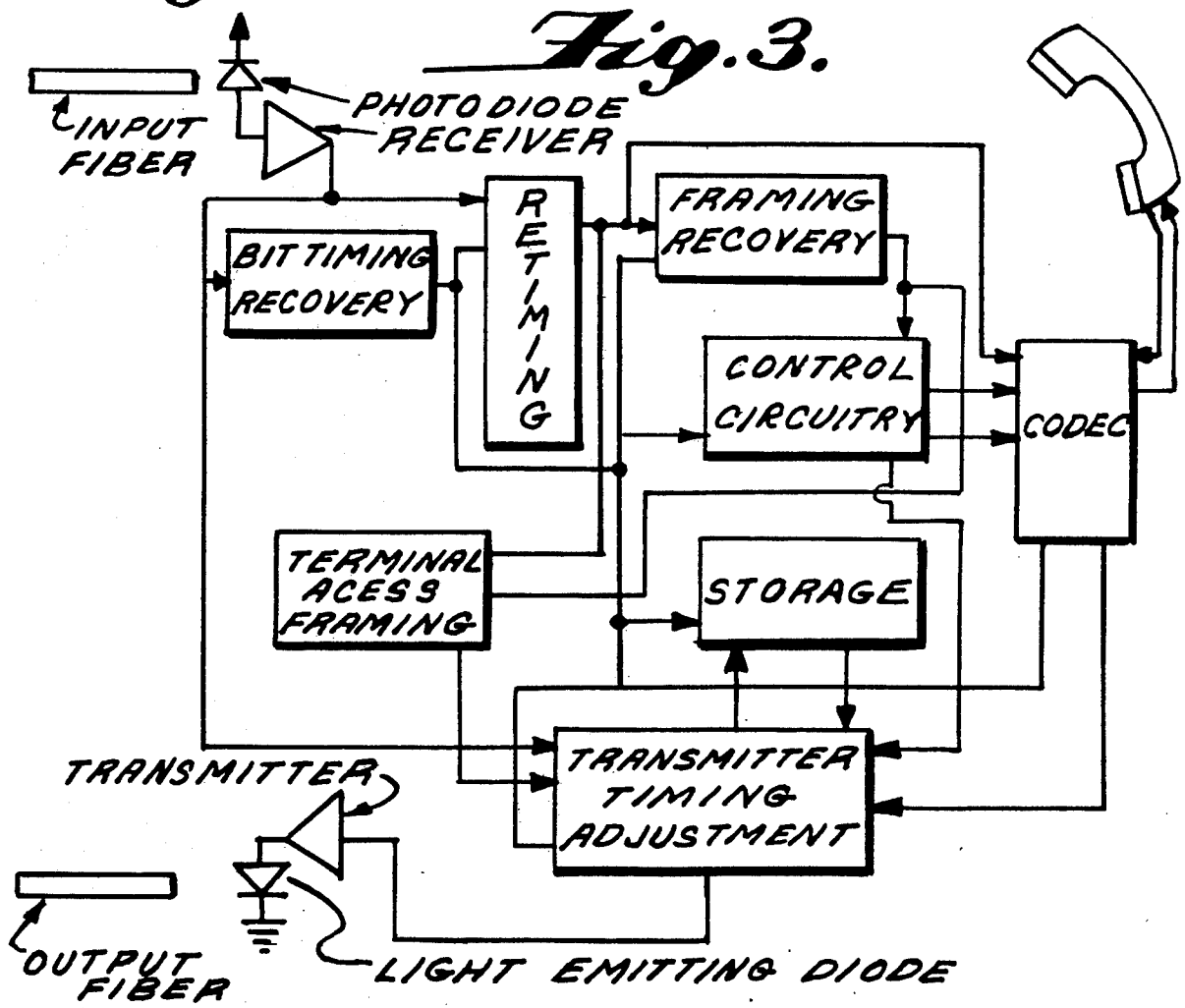

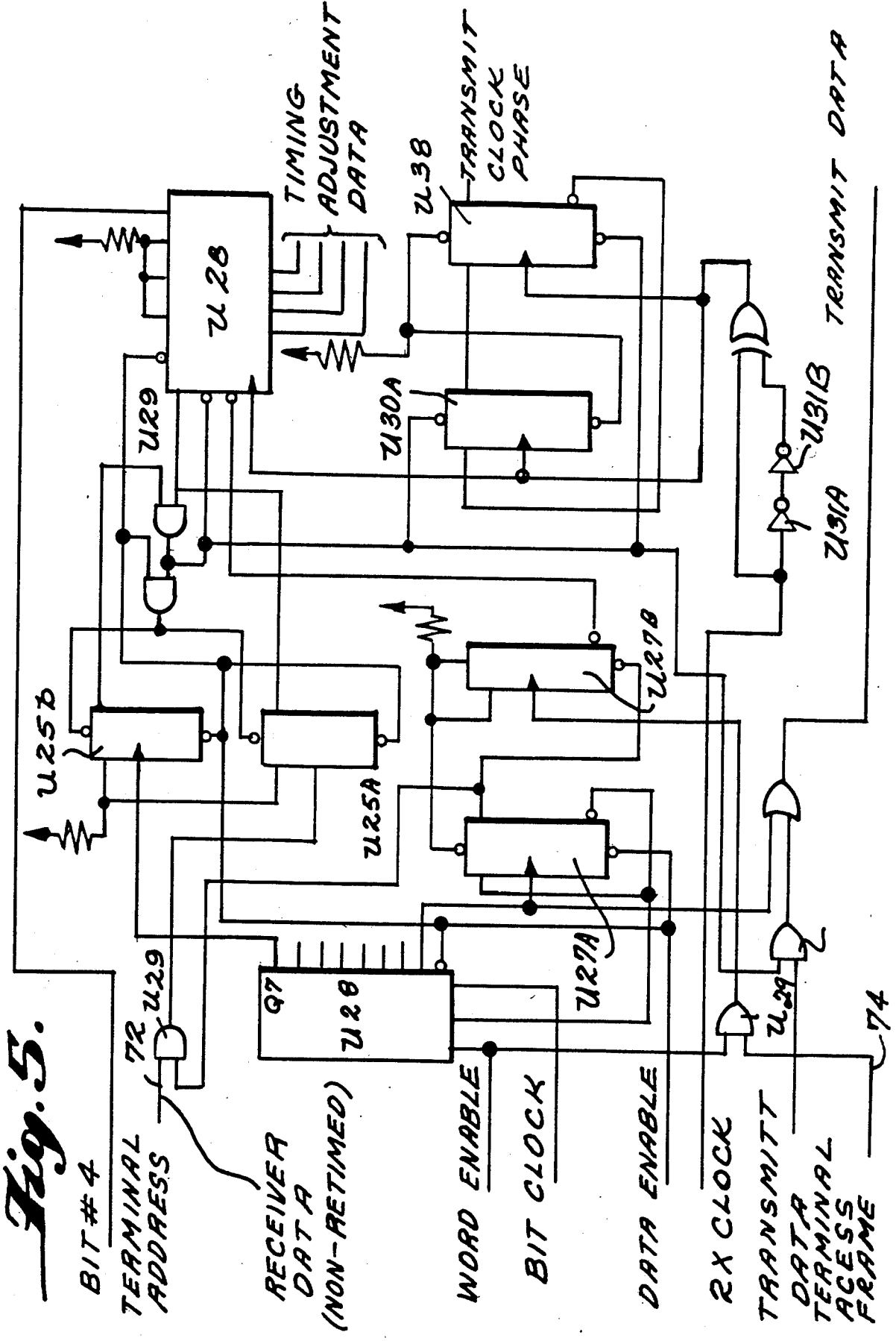

GUARD TIME ELIMINATION IN A TIME-DIVISION MULTIPLEXED, ACTIVE STAR-COUPLED, HALF-DUPLEX MODE, SYNCHRONOUS COMMUNICATIONS NETWORK

This invention relates to a method and apparatus for eliminating guard time in a time-division multiplexed, active star-coupled, half-duplex mode, synchronous communications network, and more particularly to such a method and apparatus whereby the word slot timing for each of the terminals is adjusted to eliminate guard time without disruption of other traffic concurrently being processed through the network.

The increasing requirements for data transmission in the modern office requires that local area networks maximize the amount of data which can be transmitted over the network. This invention provides a means for maximizing the data throughput of a fiber-optic, local area network supporting multiple data sources (analog voice, digitized voice, or other data input). The inputs to the network are via user "terminals" which provide the necessary circuitry for converting analog voice to digitized voice or for inserting a data channel input to the proper time slot for transmission over the network. The present invention allows the maximization of the number of terminals transmitting data through an active central node or star network.

It is, therefore, an object of the present invention to provide for elimination of guard time in a time-division multiplexed active star-coupled, half-duplex mode, synchronous communications network.

Another object is to provide for the elimination of guard time without disruption of traffic being concurrently processed through the network.

A further object of the invention is the provision of a method and apparatus for adjusting the word slot timing for each of the terminals in the network whereby the guard time at the central node between the data packets, or words, is eliminated.

Additional objects and advantages of the invention will be set forth in part in the description which follows, and in part will be obvious from the description or may be learned by practice of the invention. The objects and advantages are realized and attained by means of the instrumentalities and combinations particularly pointed out in the appended claims.

To achieve these and other objects the present invention provides a time-division multiplexed, active star-coupled, half-duplex mode, synchronous communications network for eliminating guard time at a central node between data packets received from a plurality of user terminals, the network comprising: an active central node; a plurality of user terminals; a plurality of transmission media, such as fiber-optic cables, one each connected between the central node and each of the user terminals; means located at the central node for providing framing information to each of the terminals; means located at each of the terminals for determining word slot timing for transmissions of the data packets or words from each of the terminals to the central node and from the central node to the terminals; and means located at each of the terminals and at the central node and in operative relationship with the word slot timing means and with the framing means for adjusting the transmit bit and word slot timing for each of the terminals whereby the guard time at the central node between the data packets or words is eliminated.

In accordance with the invention, the adjusting means include means for advancing the word slot timing, and the advancing means preferably include means for determining the amount of advance of the word slot timing as a function of the distance of the terminal from the central node.

Preferably, the determining means include means located at the terminal and in operative relationship with the word slot timing means and with the framing means for transmitting initialization data to the central node during the terminal's transmit word time slot whereby disruption of other traffic concurrently being processed through the network from other terminals is avoided.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 1 is a block diagram showing a conventional active star-coupled network;

FIG. 2 is a timing diagram for terminals unequal distances from the central node in the conventional star-coupled network;

FIG. 3 is a block diagram of a user terminal in accordance with the invention;

FIG. 5 is a schematic of the transmitter timing adjustment circuitry at a user terminal in accordance with the invention.

Figure 4:
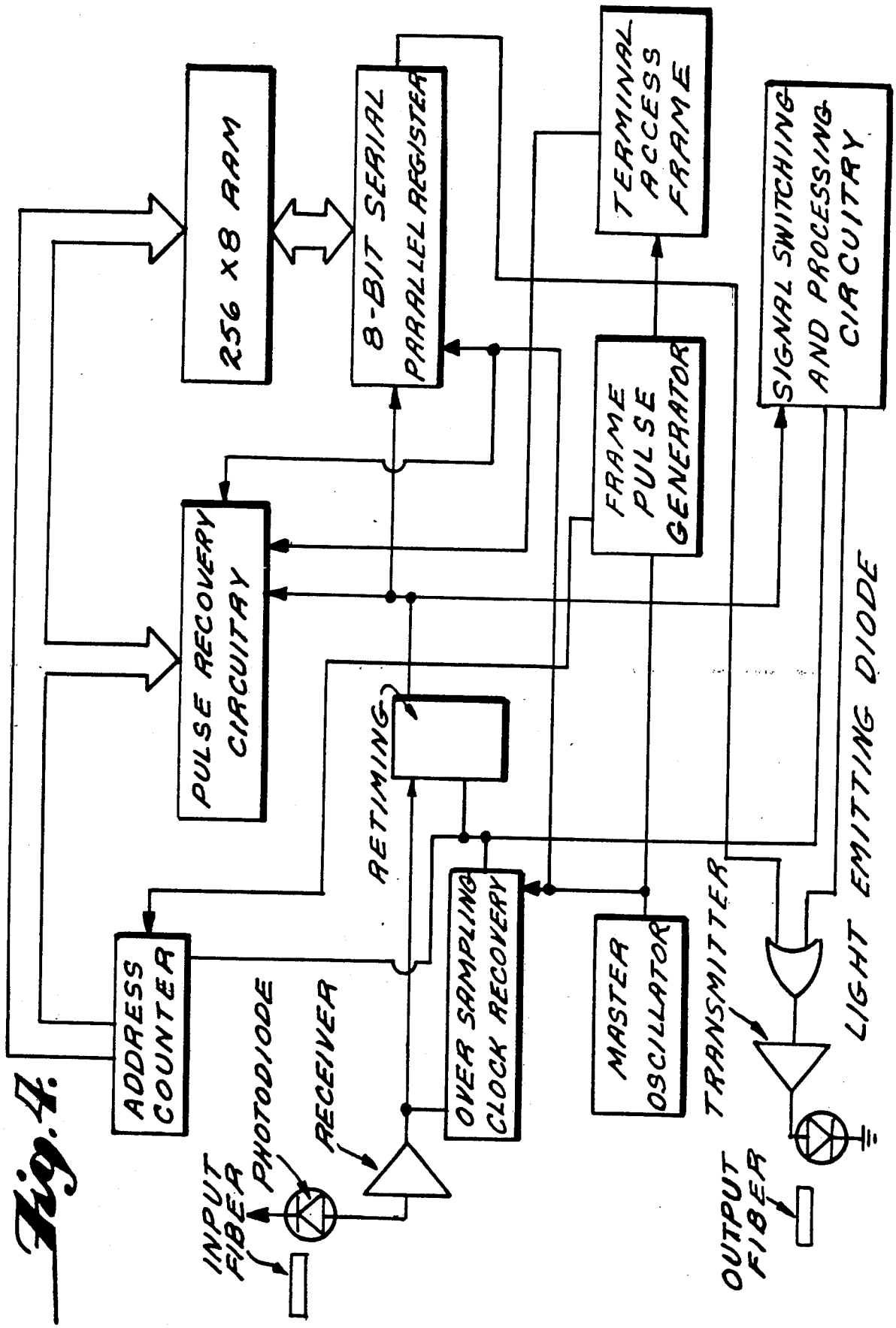
FIG. 4 is a block diagram of the central node in accordance with the invention.

With reference now to the drawings, wherein like reference characters designate like or corresponding parts throughout the several views, there is shown in FIG. 1 a conventional central node or star type network having a plurality of user terminals 10, 12, 14, 16 and 18 which may be distributed over a diverse area in any fashion so long as certain conditions, as hereinafter defined, are met. A central node 20 is also located in the network, preferably towards the center, but with no requirement that any specific location be reserved for the central node. In the instant implementation of this invention, up to thirty-two user terminals may be employed. Other implementations that would not substantively change the concept of this invention are feasible.

The invention described herein employs a unique timing strategy such that the network throughput (consisting of data packets or words from the various terminals) is limited by the device and component limitations and not by the number of terminals or the network protocol. This timing strategy minimizes the requirement for guard time at central node 20 between data packets, thereby maximizing the time allocated to the transmission of data. The timing strategy employed is to advance the transmitter timing at the terminals such that the data arriving at the central node from each terminal in the network is properly phased with data received from other terminals in the network. The terminal initiallization process required for this timing advancing is accomplished without disruption of other traffic concurrently being processed through the network.

The network functions in the simplex, or half-duplex, mode such that at any one time either transmission or reception by the central node 20 is in progress (and the converse by each of the terminals in the network). This is in contrast to radio systems which may employ similar synchronization concepts, but operate in the duplex mode of operation by placing the TRANSIT and RECEIVE data paths on distinct frequencies. Since the network uses only a single direction of transmission at any one time, a method of translating (in time) the initiallization sequence data recovered during the RECEIVE time period to the TRANSMIT time period has been devised. These RECEIVE and TRANSMIT time periods are termed "half-frames," each data frame consisting of one of each type of "half-frame." The invention described herein performs this time translation and synchronization function using a unique, all-digital approach.

Since the data received at central node 20 is serial and multiplexed in time with the data arriving at the central node in proper phase relationship (or synchronously) from various terminals, the network is synchronous. The RECEIVE timing at any particular terminals in the network will be delayed from the TRANSMIT timing at central node 20 in proportion to the distance from the terminal to the central node. The timing at different terminals will also vary from one to another, unless a terminal happens to be exactly the same distance from the central node a another terminal. A timing diagram (FIG. 2) illustrates the timing at central node 20 and at two terminals "i" and "k" located unequal distances from the central node. Terminal "k" is farther from central node 20 than is terminal "i".

The acquisition of TRANSMIT word slot timing by any terminal is accomplished without disrupting other communications transiting the network. To assure that terminal synchronization and other communications transiting the network are non-interfering, constraints are placed on the network in the form of data word size and distance from central node 20 to any terminal. The data rate of the network is set by the data rate of the sum of the terminals plus any overhead, such as framing. Given any particular number of terminals, and the data rate per terminal, the minimum data word size is defined for a maximum distance between central node and terminal. Since the instant network embodiment is oriented towards supporting telephone communications, the terminal data rate is set at 64 kilobits/second (kb/s), although other embodiments could employ different data rates without changing the concept of this invention. Using this 64 kb/s data rate per terminal, the number of terminals in the network as thirty two, and a word size of eight bits, the maximum distance between the central node and any one terminal is fixed at approximately five hundred meters. The use of a larger word size would allow greater distances from the central node, while retaining the non-interfering character of the initiallization process.

The TRANSMIT timing advancing circuitry at each terminal is identical from terminal to terminal, differing only in the time slot assignment of the terminal. Once framing is acquired, the timing adjustment circuitry is activated and a single pulse is transmitted at the beginning of the TRANSMIT time slot assigned to the terminal. This pulse is transmitted during any frame except a TERMINAL ACCESS half-frame. The TERMINAL ACCESS half-frame is used for signalling between the terminal and the central node, and use of that half-frame for initiallization could lead to a ambiguity of network operation. During the next (terminal) RECEIVE half-frame the transmitted data bit will be received by the terminal for comparison with the (stored) transmitted data bit. Any difference between the two bits is caused by transit time delay from the terminal to the central node and is used to adjust the TRANSMIT time slot position to "null out" the delay caused by the transit time inherent in data transmission from the terminal to the central node. This allows the "guard time" between data words received at the central node from different terminals to be eliminated, without the difficulty of overwriting one terminal's data word onto another terminal's data word.

Each terminal in the network must advance its transmitter timing such that transmitted data from that terminal arriving at the central node is synchronized with data arriving from other terminals. The network thus functions as a synchronous, distributed multiplexer, with framing added at the central node and data being placed into time slots by the various terminals. This distributed multiplexing function is accomplished at each terminal by acquiring bit timing, then acquiring frame timing (word boundary and terminal access frame information), then adjusting the terminal's TRANSMIT word slot timing. If any of these synchronization signals are lost, after reacquisition of the lost synchronization signal, the remainder of these synchronization signals must be subsequently reacquired. Therefore, once a terminal acquires framing (including the TERMINAL ACCESS frame information) the next function accomplished by the terminal is to establish TRANSMIT word slot timing such that the data received from that terminal at the central node is synchronous with that received by all other terminals in the network.

FIG. 3 shows in block diagram format the functions performed by each terminal. The incoming data is recovered from bifurcated optical fiber 22 using a photo-detector 24 followed by receiver 26 to translate the low-level optical signal to levels suitable for signal processing with standard digital logic. Once the signal has been recovered, the first step is to recover clock information from the data stream, shown as 28 in FIG. 3. The data is then retimed with the recovered clock estimate at 30.

The next function performed is the recovery of word boundary information, or framing. The framing recovery circuitry 32 establishes the beginning of the data frame and the status of whether the half-frame being recovered is RECEIVE or TRANSMIT data. Since the TRANSMIT word slot can occur before the TRANSMIT half-frame, a separate circuit function is used to maintain the data word boundary information for the eight bit data word either to be transmitted or received by this terminal. The control circuitry 34, in combination with the framing circuitry 32 and transmitter timing adjustment circuitry 36, generates the proper timing signals for the voice encoding-decoding integrated circuit (IC), or CODEC IC 38. For digital data inputs (other than CODEC inputs) the same circuitry provides the time slot information during which data is to be transmitted or received.

The circuitry discussed above is functional at all times during network operation. The initiallization process is used to generate the TRANSMIT word slot timing, such that the data transmitted during the TRANSMIT word time slot arrives at central node 20 properly phased with data from other terminals 10–18 operating in the network. This circuitry is also shown in FIG. 3 as the storage function 40 and the transmitter timing adjustment circuitry 36. This circuitry operates only on framing acquisition by the terminal, ie., if framing is first acquired or if reacquired after being lost.

The transmitter timing adjustment circuitry 36 sends a single data bit at the beginning of the proper TRANSMIT word time slot to central node 20 after bit timing and word timing have been established. This single data bit and its position in the transmitted time slot are stored by storage circuit 40 until the next RECEIVE frame's word time slot is decoded and provided to the timing adjustment circuitry 36 by control circuitry 34. The stored data bit is then applied to one input of a phase comparator, while the other input is connected to the received data stream (bypassing the normal timing recovery circuit 28 and 30, such that timing recovery does not mask the transmitter timing adjustment circuitry resolution). The transmitter clock and word slot timing are then adjusted (in the proper direction) until the two data bits, i.e. the stored and the recovered data bit, are properly aligned in time, although delayed by one-half frame (the balance of the TRANSMIT half-frame and the beginning of the RECEIVE half-frame), thus nulling out the transit time delay of data between the terminal and central node 20.

The circuitry at central node 20 responds to the single data bit sent by each terminal during its initiallization process by storing the recovered single data bit at the central node during the terminals' TRANSMIT half-frame and sending this stored bit back to the terminal during the terminals' RECEIVE half-frame without retiming the bit. This function is illustrated in block diagram format in FIG. 4.

Referring to FIG. 4, the recovered optical signal is translated to levels suitable for signal processing with a photodetector-receiver combination 42-44 and applied to an oversampling type of clock recovery circuit 46. This oversampling clock recovery circuit 46 uses a master oscillator clock 48 which is used to derive clock information for central node signal processing circuitry 50 and for framing pulse sequence generation circuitry 52. The oversampling clock recovery method is used at the central node due to its better immunity to the quantized phase error in the recovered data from the various terminals.

The output of the oversampling clock recovery circuit 46 is used to retime the recovered data at 54, which is then applied to a pulse recognition circuit 56, an eight-bit universal shift register 58, and to the signal switching and processing circuitry 50. Pulse recognition circuit 56 searches the serial input data stream for any data bit in any word slot, unless that word slot is being used for active data transmission, in which case a TERMINAL ACCESS bit (the equivalent of a HOOK STATUS bit for telephone operation) has been SET for that word slot. For each word slot for which no TERMINAL ACCESS bit has been SET, eight-bit universal shift register 58 is loaded with the recovered data output (oversampled) for that word time slot, and the random access memory (RAM) 60 receives the output of eight-bit universal shift register 58. Thus, if any word time slot contains an initiallization bit, pulse recognition circuit 56 can initiate retransmission of the recovered data word (consisting of one bit within the word) during the next TRANSMIT time slot for that terminal. Since the oversampling is at 8X, the RAM 60 receives eight data words to define the recovered word time slot.

The use of an 8X oversampling of the recovered data at central node 20 allows a terminal transmitter clock resolution of 4X to be maintained without a resolution error being introduced by the central node. Other clock resolutions and oversampling factors could be employed without materially changing the invention concept. The stored, oversampled data from the word time slot is retransmitted to the network (and therefore to the terminal) during the next terminal's RECEIVE half-frame without being retimed, such that the terminal receives its transmitted data bit back delayed by one-half frame, plus the delay introduced by transit time from the terminal to the central node. The pulse recognition circuit 56 is disabled during the TERMINAL ACCESS half-frames to preclude pulse recognition circuit 56 from attempting to establish transmitter adjustments with TERMINAL ACCESS bits, as well as being disabled during central node TRANSMIT half-frames. The presence of a TERMINAL ACCESS bit by any terminal is stored and used to disable pulse recognition circuit 56 during word time slots that are actively transmitting data.

RAM 60 is set to be at least two hundred fifty-six words deep, each word eight bits wide, (or 256×8), such that all thirty-two terminals in the network can simultaneously request initiallization. Additionally, eight-bit universal shift register 58 is active at all times, except when the TERMINAL ACCESS bit has been SET, such that the detection of a data bit by pulse recognition circuit 56 at some location other than the first bit position (the expected case for distant terminals) will allow the full eight words to be transmitted during an initiallization sequence. For the initiallization sequence, the central node transmitter 62 is loaded from the output of RAM 60, through eight-bit universal shift register 58, clocked at the full 8X over-sampling rate, in the reverse direction from RECEIVE data shifting direction. The output pulse is at the normal transmitted data rate, but the edge resolution is preserved as recovered by the central node.

The terminal transmitter timing adjustment circuitry at the terminal is shown in FIG. 5 for this embodiment of the invention. The circuitry shown in FIG. 5 corresponds to transmitter timing adjustment circuitry block 36 and storage block 40 shown in FIG. 3. The circuitry shown in FIG. 5 includes both the generation circuit for the single bit transmitted at the beginning of the initiallization sequence, the storage circuit (block 40 in FIG. 3), and the transmitter timing adjustment circuitry (block 36 in FIG. 3). Inputs to this circuitry include the bit clock 64, word enable control line (66 defining the beginning of the terminal's word boundary and generated by the control circuitry shown as block 34 in FIG. 3), DATA ENABLE line 68 (generated by framing circuitry 32 of FIG. 3) defining when framing has been established, TRANSMIT data line 70 (from CODEC IC 38) and a control line 74 to preclude attempting to initiallize during TERMINAL ACCESS FRAME. The remaining input 72 for this circuitry is the non-retimed data (the output of receiver 26 in FIG. 3). The outputs of this circuitry are the transmitted data stream (including the single bit used for the initiallization sequence), the TRANSMIT clock phase information, and the TRANSMIT time slot adjustment information.

Once TERMINAL ACCESS framing has been established by the terminal, the transmitter timing adjustment sequence is initiated by transmitting a single data bit at the beginning of the terminal's TRANSMIT word time slot using the Q output of flip-flop $U_{27A}$. The central node responds by providing a special RECEIVE data path (per the discussion above for the central node) consisting of minimal retiming of the recovered data (recovery by oversampling, which introduces some retiming of the data) and eliminating retiming of the data transmitted from the central node. The single data bit transmitted from the terminal is stored by the terminal in an eight-bit shift register, $U_{28}$, and clocked with bit timing during the TRANSMIT word time slot through the shift register to output $Q_7$. On reaching output $Q_7$, the output is used to clock "D" type flip flop $U_{25B}$ HIGH. No more data is loaded into $U_{28}$ after the first bit, since the $\bar{Q}$ output of $U_{27A}$ goes LOW and is used to inhibit further data entry into shift register $U_{28}$.

Once the single data bit has been transmitted (it cannot be transmitted during a TERMINAL ACCESS frame) control circuitry (34 in FIG. 3) provides a WORD ENABLE signal used to gate the non-retimed RECEIVE data to the clock input of "D" type flip-flop, $U_{25A}$ (RESET any time frame synchronization is lost). Since $U_{25B}$ is clocked HIGH by $Q_7$ of $U_{28}$ (occurring after frame synchronization is established), the phase difference between the transmitted data bit and the data bit received one-half frame later is measured in the clock cycles applied to $U_{26}$ while the received and transmitted data states are different. This phase difference is maintained as the contents of counter $U_{25}$, which provides the least significant four bits of the reference data word used to initiate the TRANSMIT word time slot. The circuitry thus uses the same counter chain for generation of the RECEIVE and TRANSMIT word time slots, changing the reference data word against which the counter chain contents are compared to derive the enable line initiating the proper word time slot.

To maintain a minimal phase error terminal TRANSMIT clock phase at the central node, the digital phase comparator used for determining the word slot timing ($U_{25A\ and\ B}$ and associated logic) is also used to set the TRANSMIT clock phase at the terminal as part of the initialization process. This is done by employing the 2X clock used to generate the 4X clock edges driving the word slot adjustment counter ($U_{26}$) to clock a pair of "D" type flip-flops configured for divide-by-four, which are disabled until the digital phase comparator ($U_{25A\ and\ B}$) indicates phase alignment of the stored and recovered data bit (indicated by the CEP input of $U_{26}$ going high). The next 4X clock edge then clocks the divide-by-four connected "D" type flip-flops, $U_{30A}$ and $U_{30B}$. The "Q" output of $U_{30B}$ then represents the TRANSMIT bit timing, or clock, which may be skewed from the phase of the RECEIVE clock in increments of ¼ cycle in this embodiment of the invention.

The invention in its broader aspects is not limited to the specific details shown and described, and departures may be made from such details without departing from the principles of the invention and without sacrificing its chief advantages.

What is claimed is:

1. In a time-division multiplexed, active star-coupled, half-duplex mode, synchronous communications network having an active central node and a plurality of user terminals, each terminal connected to said central node by a single fiber-optic cable, the method of eliminating guard time at said central node between data packets received from the user terminals, comprising the steps of:

acquiring bit timing at each one of said user terminals;
acquiring frame information at said user terminals;
establishing word slot timing at each one of said user terminals; and
adjusting the transmit word slot timing of said terminals to eliminate guard time at the central node between the data packets received from the user terminals.

2. A method as in claim 1 wherein said step of adjusting the transmit word slot timing further includes the steps of:

transmitting initiallization data from each of said user terminals to said central node during the transmit word time slot of each said terminal so as not to disrupt other traffic concurrently being processed by said network;
storing said initiallization data at said terminal from which said data is transmitted;
receiving said data at said central node;
storing said data at said central node during the balance of the transmit half-frame of said terminals and during a predetermined portion of the receive half-frame of said terminals;
transmitting said data back to said terminal from said central node during the next receive half-frame of said terminals;
receiving said data at said terminal during said next receive half-frame word time slot of said terminal;
comparing the phase of said data at said terminal with that of said data received at said terminal from the central node; and
adjusting the transmit word time slot of said terminal to eliminate any delay caused by the transit time of data from said terminal to said central node, whereby the guard time between data packets or words received at the central node from the user terminals is eliminated without disrupting other traffic concurrently being processed through the network.

3. A method as in claim 2 wherein the transmit word time slot of said terminal is advanced.

4. A method as in claim 3 wherein said initiallization data is a single data bit.

5. A method as in claim 4 wherein said single data bit is transmitted at the beginning of the transmit word time slot of each said terminal.

6. In a time division multiplex, active star-coupled, communications network comprising a central node and a plurality of user terminals, wherein data packets are transmitted between the plurality of user terminals and the central nodes and guard bands provided between data packets prevent data overwriting, a system for reducing the duration of said guard bands and thereby increasing data packet density, comprising:

first means for transmitting data traffic and initialization data from each of said plurality of user terminals to said central node;
second means in communication with said central node for providing timing and framing information to each of said user terminals;
third means in communication with each of said user terminals for recovering said timing and framing information, and in response, determining word transmission timing at said user terminals with respect to said framing information;
fourth means in communication with said central node for distinguishing between said data traffic and said initialization data transmitted by said plurality of user terminals to said central node; and fifth means for adjusting said word transmission timing with respect to said framing information established by said central node to reduce the duration of said guard bands.

7. A system of claim 6, wherein said second means is located at said central node.

8. The system of claim 6, wherein said third means is located at said user terminals.

9. The system of claim 6, wherein said communications network is a half-duplex mode network.

10. The system of claim 6, wherein said adjusting means includes means responsive to said third means for advancing word transmission timing as a function of data propagation time between said central node and each of said user terminals.

11. The system of claim 10, wherein said word transmission timing adjusting means includes means responsive to said word transmission timing and said framing information for transmitting said initialization data to said central node independent of said data traffic.

12. The system of claim 10, wherein said adjusting means includes means for comparing initialization data transmitted by each user terminal with initialization data retransmitted by said central node to determine data propagation time and, in response, adjusting said timing.

13. The system of claim 12, wherein said adjusting means further includes means for storing initialization data at said user terminals, means for detecting initialization data received by said central node, means for storing said detected initialization data at said central node for a Predetermined period of time synchronized to said framing information, means for re-transmitting said stored initialization data to said user terminals following said predetermined time period and means for comparing said retransmitted initialization data received by each user terminal with said initialization data transmitted by said each user terminal to determine said data propagation time.

14. The system of claim 13, wherein said word transmission timing adjusting means further includes means for comparing the phase of said retransmitted initialization data with the phase of said initialization data stored in said user terminals.

15. The system of claim 6, including fiber optic cables between said central node and said user terminals for carrying said data traffic and initialization data therebetween.

16. In a time division multiplexed, active star-coupled, half-duplex mode, communications network comprising a central active node and a plurality of user terminals, and a transmission medium between said user terminals and said central node for carrying data packets therebetween, wherein guard bands are provided between successive data packets to prevent data overwriting, a system for reducing the duration of said guard bands and thereby increasing data packet density in said medium, comprising:
  means for transmitting data traffic and initialization data from each of said user terminals to said central node;
  means for storing initialization data at said user terminals;
  means in communication with said central node for providing timing and framing information to said user terminals;
  means in communication with said user terminals for recovering said timing and framing information, and for correlating said stored initialization data with said timing and framing information;
  means for storing said initialization data received by said central node for a predetermined period of time related to said framing and timing information, and thereafter, retransmitting said initialization data to said user terminals;
  means for comparing said retransmitted initialization data with said initialization data stored at said user terminals; and
  means for comparing the phase of said retransmitted initialization data received by said user terminals and said initialization data stored at said user terminals for adjusting said word transmission timing to reduce the duration of said guard bands.

17. The system of claim 16, wherein said transmission medium comprises fiber optic cables.

* * * * *